(12) United States Patent
Jemaa et al.

(10) Patent No.: US 8,709,203 B2
(45) Date of Patent: Apr. 29, 2014

(54) FRACTIONATION OF A WASTE LIQUOR STREAM FROM NANOCRYSTALLINE CELLULOSE PRODUCTION

(75) Inventors: Naceur Jemaa, Pointe-Claire (CA); Michael Paleologou, Beaconsfield (CA); Xiao Zhang, Richland (CA)

(73) Assignee: Fpinnovations, Pointe-Claire, QC (CA)

( * ) Notice: Subject to any disclaimer, the term of this patent is extended or adjusted under 35 U.S.C. 154(b) by 74 days.

(21) Appl. No.: 13/388,455

(22) PCT Filed: Jul. 28, 2010

(86) PCT No.: PCT/CA2010/001198
§ 371 (c)(1),
(2), (4) Date: May 8, 2012

(87) PCT Pub. No.: WO2011/017797
PCT Pub. Date: Feb. 17, 2011

(65) Prior Publication Data
US 2012/0211184 A1    Aug. 23, 2012

Related U.S. Application Data

(60) Provisional application No. 61/232,906, filed on Aug. 11, 2009.

(51) Int. Cl.
*D21C 9/00* (2006.01)
*D21C 11/00* (2006.01)
*B01D 61/02* (2006.01)
*C08B 15/08* (2006.01)
*C01B 17/90* (2006.01)

(52) U.S. Cl.
CPC ............. *D21C 9/00* (2013.01); *D21C 11/0007* (2013.01); *B01D 61/027* (2013.01); *C01B 17/902* (2013.01); *C08B 15/08* (2013.01)
USPC ........................................ 162/37

(58) Field of Classification Search
CPC .... D21C 9/00; D21C 11/0007; B01D 61/027; C01B 17/902; C08B 15/08
USPC ........................................... 162/37
See application file for complete search history.

(56) References Cited

U.S. PATENT DOCUMENTS 5,403,604 A    4/1995  Black, Jr.
(Continued)

OTHER PUBLICATIONS

Treffry-Goatleya et al. (Jan.-Feb. 1993). The application of nanofiltration membranes to the treatment of industrial effluent and process streams. Filtration & Separation, 30(1), 63-66.

(Continued)

*Primary Examiner* — Jacob Thomas Minskey
(74) *Attorney, Agent, or Firm* — Norton Rose Fulbright Canada LLP

(57) ABSTRACT

During nanocrystalline cellulose (NCC) production, a considerable amount of sulphuric acid is used. After the separation of the NCC, the remaining solution contains sugars and residual sulphuric acid. The sugars are in the monomeric and oligomeric forms. To reduce the cost of NCC production and to produce other added-value products, the spent acid stream can be fractionated into sugar oligomers, sugar monomers, and acid. The acid can be recycled to the NCC manufacturing process after concentration. The sugar monomers and sugar oligomers can be used for the manufacturing of other valuable chemicals. Membrane nanofiltration can be used to achieve this objective. A polymeric membrane with a molecular weight cut-off in the range of 200 Dalton was employed. Using this approach, the majority of the acid was recovered in the permeate while the sugars were concentrated in a smaller stream. The sugar level in the separated acid/permeate stream was only about 3% of the original concentration. A second membrane filtration stage can be used to separate the monomeric from the oligomeric sugars. The two sugar streams can be employed in different applications to produce value-added products.

20 Claims, 2 Drawing Sheets

(56) References Cited

U.S. PATENT DOCUMENTS

| | | |
|---|---|---|
| 5,407,580 A | 4/1995 | Hester |
| 5,518,733 A | 5/1996 | Lamothe et al. |
| 5,580,389 A | 12/1996 | Farone |
| 5,869,297 A | 2/1999 | Binder et al. |
| 5,968,362 A | 10/1999 | Russo, Jr. |
| 7,008,485 B2 | 3/2006 | Heikkila et al. |
| 7,077,953 B2 * | 7/2006 | Ranney ............... 210/195.2 |
| 7,338,561 B2 | 3/2008 | Theoleyre |
| 2009/0173339 A1 * | 7/2009 | Heikkila et al. ............ 127/55 |

OTHER PUBLICATIONS

International Search Report, PCT/CA2010/001198, dated Nov. 18, 2010.

* cited by examiner

US 8,709,203 B2

FRACTIONATION OF A WASTE LIQUOR STREAM FROM NANOCRYSTALLINE CELLULOSE PRODUCTION

CROSS-REFERENCE TO RELATED APPLICATIONS

This application is a National entry of PCT/CA2010/001198 filed Jul. 28, 2010, in which the United States of America was designated and elected, and which remains pending in the International phase until Feb. 11, 2012, which application in turn claims priority under 35USC 119(e) from U.S. Provisional Application Ser. No. 61/232,906, filed Aug. 11, 2009.

TECHNICAL FIELD

The present invention relates to the fractionation of a sugar/acid waste stream generated during the production of nanocrystalline cellulose (NCC) from cellulose-containing feedstocks into acid, sugar monomers, and oligomers.

Membrane filtration (nanofiltration) is used to separate the residual acid, especially sulphuric acid, from the sugars thus enabling the recycling of the acid within the NCC manufacturing process.

This approach reduces the amount of acid required by the NCC process and hence the production cost of NCC. The sugars can be further fractionated into monomeric and oligomeric sugars employing a second filtration step. The fractionated sugars can be used for different value-added products.

BACKGROUND ART

The production of nanocrystalline cellulose (NCC) from several cellulose sources including wood pulp involves an acid hydrolysis step. Depending on the starting cellulosic material, a considerable amount of acid such as sulphuric, nitric, phosphoric, or hydrochloric acid can be employed. Nanocrystalline cellulose has very interesting and unique properties different from those of pulp fibres and microcrystalline cellulose. It can be used in several applications.

Typically, a sulphuric acid concentration of between 50 and 70 wt % is employed. After the separation of the NCC particles, a solution rich in sulphuric acid and sugars is obtained. This spent acid stream is free of suspended solids and contains mainly sugar oligomers, sugar monomers and acid; this stream is typically considered a waste stream presenting disposal problems.

It would reduce the operating cost of the NCC process and the discharge of waste streams to the environment, if the acid could be separated and recycled to the NCC process. This would require that the acid be concentrated by evaporation to its original level, but if the sugars are not separated from the acid, concentrating the acid leads to the degradation of these sugars by dehydration leading to the formation of products like furfural and hydroxymethylfurfural and low molecular weight organic acids. In addition, fouling of the heat transfer area during the acid concentration step is possible due to sugar caramelisation during the evaporation process.

The fermentation of monomeric sugars in the presence of oligomers is not an easy process to perform since the latter act as fermentation inhibitors. Oligomers are polymeric carbohydrates having a degree of polymerisation of 2-10. The separation of the sugar monomers from the sugar oligomers is a desirable and an attractive option which may be of use in the production of other value-added products. Monomeric sugars can be fermented to produce ethanol. Oligomeric sugars can be used for instance in the food and pharmaceutical industries. Recently, a growing interest is being given to oligosaccharides due to their nutritional benefits when added as ingredients in some foods. Cellulose oligomers (e.g. cellobiose) are known to act as pre-biotics when added to animal feed. The incorporation of cellobiose in medical drugs, food, and cosmetics is being developed in Japan. Other studies showed that administrating fructo-oligosaccharides and galactooligosaccharides can increase the number of useful bacteria in the colon while suppressing the number of harmful bacteria.

Xylooligosaccharides can be utilised as prebiotics and tend to lower the risk of colon cancer. Xylooligosaccharides are used as food ingredients and tend to lower cholesterol levels. It was reported that human milk may contain at least twenty-one different kinds of oligosaccharides. These oligosaccharides play a vital role in infant growth and the development of the immunisation system. Several studies have been conducted and showed the benefits of adding galacto-oligosaccharides to cow's milk based infant formula. The incorporation of these sugar oligomers in dairy products and desserts is increasing worldwide due to the increase in consumer health consciousness. Oligosaccharides have also been incorporated in cosmetics for skin treatment (EP0591443).

The separation of sugars from acid solutions in different applications has been investigated in the prior art. Several approaches such as ion exchange have been devised. Most of the work in the previous art dealt with biomass hydrolysate solutions.

For example, U.S. Pat. No. 5,580,389 discusses the separation of acid from sugars from strong acid hydrolysis of biomass. The method involves several steps such as removal of silica, decrystalysation, hydrolyzation, and sugar/acid separation. The latter separation was performed using a strong acid resin to retain the sugars. Acid was used to regenerate the resin and obtain a 2% sugar solution.

U.S. Pat. No. 5,407,580 describes a method to separate acid from a non-ionic component such as sugar using ion exclusion.

U.S. Pat. No. 5,968,362 describes a method for separating acid and sugars from a biomass acid hydrolysis step. The process involves an anion-exchange resin or an ion-exclusion chromatographic material to retain the acid from the hydrolysate. The sugars produced are contaminated with acid and metals. The author proposes a treatment with lime to neutralise the solution and precipitate the metals.

U.S. Pat. No. 5,403,604 deals with sugar separation from juices using a set of membrane units including ultrafiltration, nanofiltration and reverse osmosis. The sugars are retained by the NF membrane while acids such as citric acid pass through. The total acid concentration in the feed stream is about 0.79 wt % while the total sugar varies from 4.3 to 14.3%.

U.S. Pat. No. 7,338,561 describes a process for purifying an aqueous solution containing sugars, multivalent cations, monovalent metal cations, monovalent anions and multivalent inorganic anions and/or organic acid anions. The process employs a strong anionic resin, a strong cationic resin, a nanofiltration device, a cristallisation unit, a reverse osmosis unit, and up to two chromatography columns. This approach was applied to a permeate from an ultrafiltration unit treating whey. The use of all of these units to perform the desired separation is complicated and does not seem to be economically attractive.

U.S. Pat. No. 7,077,953 deals with acid recovery from a hydrolysate solution obtained after exposing wood chips to an acidic solution. In this case, the sugars and the acid were contaminated with several other compounds such as lignin, metals, and suspended solids. A chromatographic unit is used to separate most of the sugars from the hydrolysis process. Water is employed to elute the sugars which are sent to a processing unit such as a fermentation/distillation unit. The chromatographic unit yields a dilute sugar stream which upon fermentation yields a diluted product that requires more energy to concentrate. The acid-rich stream from the chromatographic system is processed using a nanofiltration unit to remove the remaining sugars. The author also suggests a second nanofiltration unit ahead of the chromatographic unit to concentrate the sugars. However, in this case, monovalent metals and other ions such as chloride and potassium may accumulate in the acidic stream and cause fouling or corrosion of the metal surfaces during evaporation. In addition, in such a system, lignin is expected to accumulate in the concentrate or the sugar stream (permeate) causing its contamination. Metals or lignin present in the sugars may inhibit the fermentation of sugars to other valuable products such as ethanol. The author did not attempt to further fractionate the sugars.

U.S. Pat. No. 5,869,297 employs nanofiltration using polyimide nanofilters for the separation of dextrose. The feed solution contained higher saccharides such as disaccharides and trisaccharides.

U.S. Pat. No. 7,008,485 describes the use of nanofiltration to separate several small molar mass compounds from each other. The approach includes the separation of pentose sugars from hexose sugars, the separation of maltose from maltotriose, and the recovery of xylose from spent liquor. Ahead of the nanofilter a one or more pre-treatment steps such as ion exchange, ultrafiltration, chromatography, concentration, pH adjustment, filtration, dilution and crystallization may be required. Any combination of these units may be needed downstream in the nanofiltration process for further separation.

No attempt was made in the prior art to separate acid from the sugars and sugar oligomers from sugar monomers. The spent acid from an NCC plant is much purer than a typical biomass hydrolysate stream since the starting feedstock is bleached pulp which contains practically no lignin and metals. In addition, ion exchange uses chemicals to regenerate the resin and yields dilute streams. Hence, such an approach may be less economically attractive compared to the use of membranes, especially in the case of NCC production where the spent acid is purer than a biomass hydrolysate stream. A set of two nanofiltration units, having membranes with different molecular weight cut-offs, is sufficient to fractionate the spent acid into sugar monomers, sugar oligomers, and acid. Typically oligomers have a degree of polymerisation of 2 or higher. Therefore, the separation of the oligomers from the monomers requires a more open membrane than the one used for sugar/acid separation. This approach is much more economically viable compared to the processes mentioned above where several separation units are required.

DISCLOSURE OF THE INVENTION

This invention seeks to provide a process for fractionating an aqueous waste liquor, especially an aqueous waste liquor formed in the production of nanocrystalline cellulose (NCC) into acid and monomeric and oligomeric sugars. The acid can be recycled in the NCC process while the sugar monomers and the sugar oligomers may be used in the production of other value-added products.

This invention also seeks to provide a process for producing NCC.

Further, this invention seeks to provide an improvement in a process for producing NCC by acid hydrolysis of bleached wood pulp.

In one aspect of the invention there is provided a process for recovering an inorganic acid from an aqueous waste liquor comprising:

providing an aqueous liquor derived from production of nanocrystalline cellulose (NCC), said liquor comprising an inorganic acid and sugars;

contacting said liquor with a first side of a nanomembrane selective for the passage of the inorganic acid; and recovering an aqueous permeate containing said inorganic acid at a second side of said membrane opposed to said first side, said aqueous permeate being substantially free of said sugars.

In another aspect of the invention there is provided in a process for producing NCC comprising acid hydrolysis of bleached wood pulp and separating NCC from an aqueous waste liquor containing acid and sugars, the improvement comprising separating an aqueous acid substantially free of said sugars from said aqueous waste liquor, with a nanomembrane selective for said acid.

In still another aspect of the invention there is provided process for producing NCC comprising:

acid hydrolysis of bleached wood pulp;

recovering NCC from said hydrolysis;

recovering an aqueous waste liquor from said hydrolysis, said
aqueous waste liquor containing acid and sugars derived from said hydrolysis of bleached wood pulp;

subjecting said aqueous waste liquor to a process of the invention, concentrating said aqueous permeate from said nanomembrane to an aqueous acid solution having a concentration suitable for acid hydrolysis of bleached wood pulp, and recycling said aqueous acid solution as an acid supply to said acid hydrolysis.

DETAILED DESCRIPTION OF THE INVENTION
WITH REFERENCE TO DRAWINGS

The production of NCC is particularly described herein by reference to the use of sulphuric acid but other acids especially inorganic acids such as hydrochloric acid may be employed.

During the production of NCC from bleached pulp, a waste stream containing sulphuric acid and sugars is obtained. Nanofiltration is used to separate the acid from the sugars. It was found that most of the acid can be recovered. The sugar content remaining in the separated acidic stream was only a small percentage of the original sugar content. The acid can thus be concentrated and recycled to the NCC production process while the monomeric sugars can be used for the production of other useful products such as ethanol, sorbitol, succinic acid, and hydroxymethylfurfural. Oligomeric sugars can be employed in the food or pharmaceutical industries.

The separated acid stream is substantially free of the sugars, by which is intended that the content of sugars is sufficiently low that the sugar content does not interfere with the acceptability of the separated acid stream as a source of acid, after appropriate concentrating, for the NCC production process. Typically the separated acid stream from the nanofiltration unit should have a ratio of sugar to acid of less than 0.8%, more usually less than 0.5% and, preferably, no more than about 0.3%, by weight.

The first step of the NCC production process involves grinding bleached pulp to particles less than 1 mm in size. Concentrated sulphuric acid is then added to the cellulose particles at 45-65° C. The system is left to react, with mechanical stirring, for about 25 minutes. A significant amount of water is then added to dilute the a and stop the reaction. During a filtration step, the NCC is concentrated and separated from the acid and sugars. The spent liquor/acid solution from this step contains mainly sulphuric acid and sugars.

Figure 1:
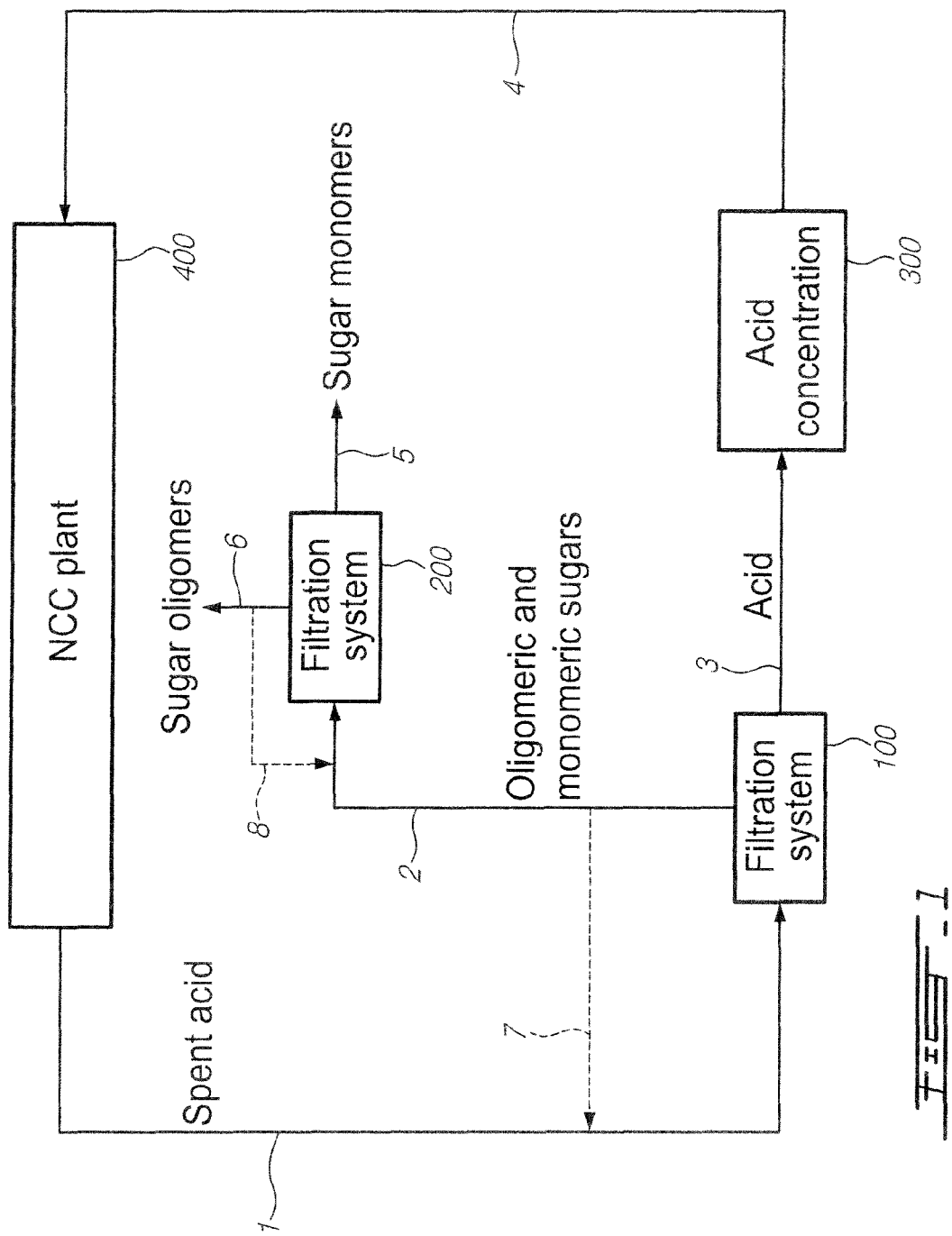
FIG. 1. is a flow diagram illustrating the fractionation of the waste liquor stream from an NCC plant into sugar oligomers, sugar monomers, and acid. Separation of the acid from the sugars is achieved first using a nanofiltration unit. Oligomers are separated from monomers using a second membrane unit. The acid is concentrated and recycled to the NCC plant.

Sugars in the spent acid are a mixture of monomers and oligomers. The separation of monomers and oligomers is beneficial since it can lead to the production of value-added products. FIG. 1 shows an example of the spent acid splitting into acid, monomers and oligomers using two membrane filtration units. The spent acid feed stream 1 from an NCC plant 400 is first fed to a nanofiltration unit 100 where an acid stream 3 is separated from the sugars. The acid stream 3 can be concentrated by evaporation 300, for example, to the desired concentration, typically of between 50 and 70 wt %, and delivers as a recycle stream 4 for reuse in the NCC manufacturing plant 400. Other combinations of concentration units can also be employed. A stream 2 of oligomeric and monomeric sugars from nanofiltration unit 100 is fed to a second membrane unit 200 where a stream of sugar monomers 5 is separated from the sugar oligomers which form a stream 6. If needed further fractionation of the oligomers in stream 6 is possible.

The nanomembrane of the second filtration unit 200 has pore sizes larger than those of the first unit 100 since oligomer sugars are larger than monomeric sugars. Typically oligomers have degree of polymerisation higher than 2. Therefore, a membrane unit with the appropriate molecular weight cut-off (larger than the one mentioned below in the example) is able to separate the monomer sugars from the oligomer sugars.

In order to enhance the final concentration of the sugar monomers and oligomers, part of the stream 2 from nanofiltration unit 100 can be recycled as a concentrate stream 7 and mixed with the feed stream 1 to unit 100. Similarly, to further increase the oligomer concentration in the final product, part of the stream 6 the second filtration unit 200 can be recycled as concentrate stream 8 to the stream 2 entering unit 200.

Figure 2:
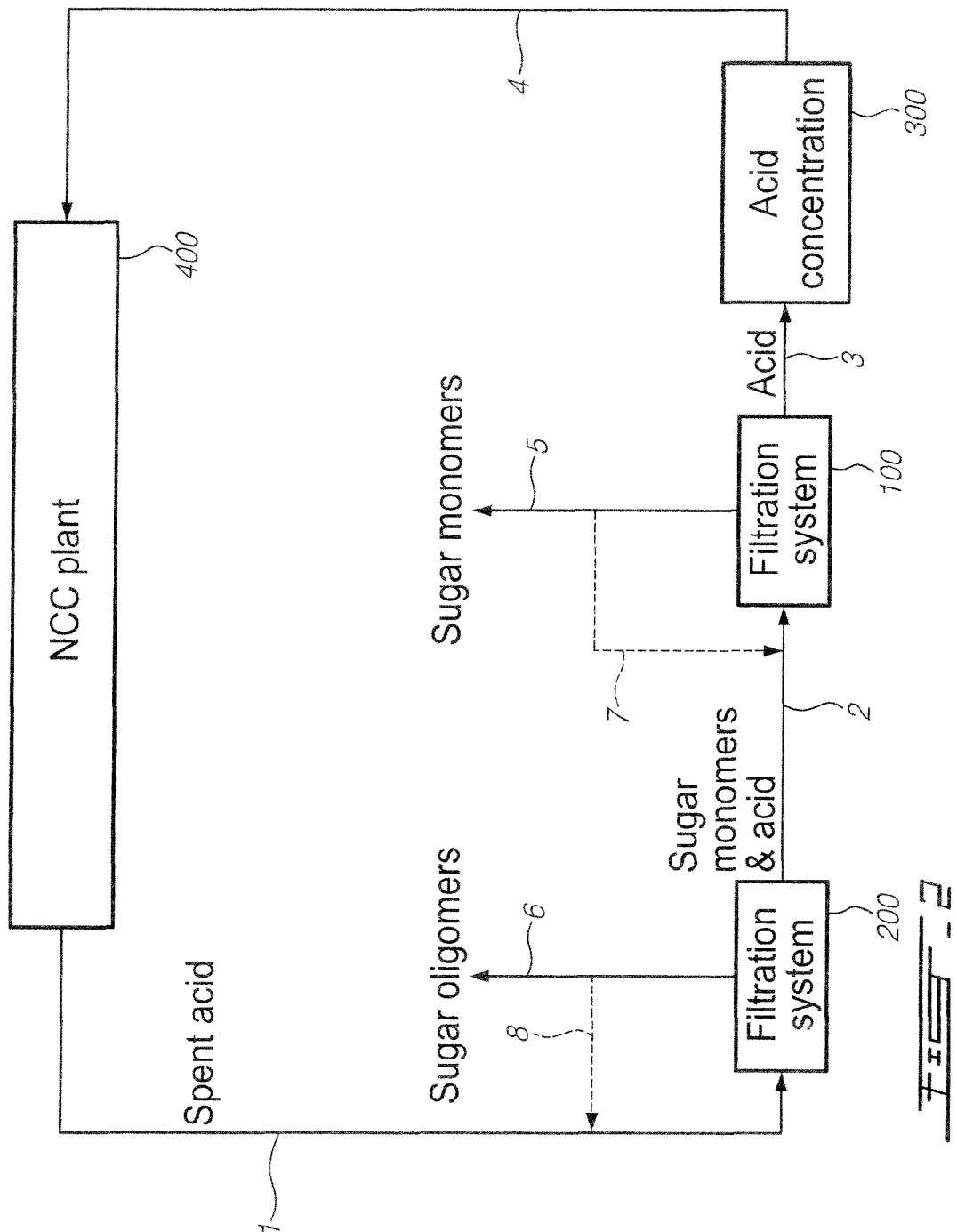
FIG. 2. is a flow diagram of an alternative option for the fractionation of the waste liquor from an NCC plant. Sugar oligomers are first separated from the acid/sugar monomer mixture using a membrane unit. The acid is then separated from the monomeric sugars by nanofiltration. The acid is concentrated and recycled to the NCC plant.

FIG. 2 shows a second arrangement for the separation of the invention. In this case, a nanofiltration unit 200 can be first used to treat the spent acid feed stream 1 from the NCC plant 400 and to isolate a stream 6 of sugar oligomers from a stream 2 of the spent acid and sugar monomers. A second filtration unit 100 can be employed for separation of the acid and the sugar monomers from stream 2 as an acid stream 3 and a stream 5 of sugar monomers. The sugar monomers of stream 5 can be, for instance, fermented to produce ethanol at high efficiency, without interference from the sugar oligomers which are known to act as inhibitors when present during the fermentation of sugar monomers.

The sugar oligomer stream 6 can be used to produce a wide range of chemicals for the food, pharmaceutical, and papermaking industries.

The above approaches apply to waste solution containing sugars (in the monomeric and oligomeric forms) and sulphuric or hydrochloric acid or other acids.

The acid in stream 3 is concentrated in unit 300, typically to a concentration of between 50 and 70 wt %, and recycled in stream 4 to the NCC plant 400.

In order to enhance the sugar monomer concentration part of the stream 5 is recycled as stream 7 to the stream 2 to the unit 200. Similarly, a part of stream 6 may be recycled as stream 8 to stream 1 to enhance the concentration of sugar oligomers present in stream 6.

The nanomembrane is selected so that it permits the migration therethrough of the ions of the acid as an aqueous permeate, while passage of the sugars is essentially hindered or prevented. The nanomembrane has nanopores which allow passage of the small ions of the acid but do not allow passage of the larger sugar molecules.

A suitable membrane for nanofiltration unit has a molecular weight cut off (MWCO) of about 200 and thus separates the acid (MW of sulphuric acid 98) from the sugars which have molecular weights of about 200 or higher (MW of glucose 180). Furthermore the MW is only one factor, the orientation or spatial arrangement of the sugar molecule is also a factor which may prevent a sugar from passing through the pores of the nanomembrane; weak bonding associations between sugar monomers may also prevent a sugar from passing through the pores of the nanomembrane. So even though glucose has an MW of 180 it does not migrate with the acid through a membrane having a MW cut off of about 200.

First the acid has $H^+$ cations which are small in size these can easily pass through the membrane dragging the anions ($HSO_4^-$, $SO_4^{2-}$) to maintain the electroneutrality of the solution.

The oligomeric sugars (the main component of the sugars) have higher MW than 200, and typically at least about 360 and are rejected by the membrane. Of course, factors other than size can impact separations using nanofiltration, therefore, it is not easy to somebody skilled in the art to predict the outcome of such separations.

The separation of monomer sugars from sugar oligomers in FIG. 1 is achieved with the nanofiltration unit 200 which has an MW cut off intermediate the MWs of the sugar monomers and the sugar oligomers, thereby allowing passage of the sugar monomers. This same unit 200 in the embodiment of FIG. 2 allows passage of the acid as well as the sugar monomers whereby the acid and sugar monomers are separated as the permeate from the sugar oligomers, in a first stage, and thereafter the acid is separated from the sugar monomers, in a second stage, by the nanofiltration unit 100.

The sugar content in the acidic stream is a small fraction of the initial feed content, for example about 3%. It could be lowered with another filtration unit but this is unnecessary and would render the process less economically attractive. Surprisingly, at these low sugar levels, no problem is encountered when the acid is concentrated to a level satisfactory for use in the acid hydrolysis of bleached wood pulp to form NCC. On the other hand the sugars in the acid are not lost since the acid is recycled to the NCC plant.

In particular, the acid recovered as permeate is concentrated to a concentration of 60% to 68%, by weight, more especially about 64%, by weight, so as to be suitable for the acid hydrolysis of bleached wood pulp to form NCC.

Particularly it is surprisingly found that at low sugar content, the sugars do not precipitate and cause fouling during the evaporation process to concentrate the separated acid stream to the necessary concentration level for use in the acid hydrolysis of bleached wood pulp to form NCC. At the same time the process of the invention has the advantage that it allows for recovery of the sugars as value products, more especially a monomeric sugar value product and a separate oligomeric sugar value product.

Other approaches to separate acid and sugars might include: ion exchange, membrane filtration and chromatography. The cost and energy consumption of these processes depend on the starting feed stock. The NCC stream is clean (no suspended solids, no metals, no lignin) thus membrane separation represents a cost effective approach.

The separated acid will be recycled to the NCC plant as long as the sugar content is low. It has been found that with a nanomembrane the sugar content in the acid is constant and low.

The sugars found in this spent liquor are a mixture of monomers and oligomers of arabinose, galactose, glucose, xylose, and mannose. Table I presents an example of spent acid composition in terms of sugars and sulphuric acid after NCC production from a softwood bleached pulp. Glucose is the major sugar found in the cellulose acid hydrolysate as seen in Table I. In this particular sample, about 38% of the sugars are in the monomeric form while the rest are in the oligomeric form. The acid concentration in this particular sample was about 71.5 g/L. Thus, the acid concentration was about 7 wt % while the sugar content was about 0.5 wt %.

TABLE I

NCC spent acid composition

| Samples (g/L) | Arabinose (g/L) | Glucose (g/L) | Xylose (g/L) | Mannose (g/L) | Total sugars (g/L) | $H_2SO_4$, g/L |
|---|---|---|---|---|---|---|
| Feed | 0.045 | 4.177 | 0.815 | 0.563 | 5.6 | 71.5 |
| Monomers | 0.041 | 0.95 | 0.852 | 0.294 | 2.14 | |

Sulphuric acid has a molecular weight of about 98 while the sugars have a molecular weight of about 180 (for glucose). In this particular case, the separation mainly involved the removal of sulphuric acid from the sugar solution. Our objective was to recover as much of the acid as possible with as low a concentration of sugar in it as possible so that during the acid concentration step (evaporation) the sugars will not caramelise on the evaporator.

The nanofiltration membrane SelRO® MPF-34, from Koch Membrane Systems, having a molecular weight cut-off of about 200 Dalton was selected because it is stable in a wide pH range. Generally, the temperature of the acid/sugar-containing stream ranges from 40-65° C. The solution was heated to 45° C. and placed in a membrane lab-cell system. The membrane had a surface area of about 28 $cm^2$. A constant pressure of about 420 psig was applied. The unit can process about 500 mL of solution. The filtrate exiting the cell was collected in a separate flask. The concentrate circulated in the upper compartment of the filtration unit. The initial flux through the nanofiltration membrane was 32 lmh (liters/$m^2$/hour) and slightly decreased as the sugars were concentrated. Under the same condition and using the same nanofiltration membrane, membrane fluxes, in the case of spent acid from an NCC plant, are much higher than those obtained from the treatment of a typical biomass hydrolysis stream by a factor of 2.

At the end of the experiment, the unit was stopped and samples were analysed. Results of this laboratory trial are presented in Table II. About 82% of the initial sulphuric acid was recovered in the permeate solution. Higher acid recovery is possible by increasing the concentration factor. Using nanofiltration, the sugars were concentrated whereas in the case of a chromatographic separation they will be diluted. Only 3% of the initial sugar amount was found in the sulphuric acid stream. Other polymeric and inorganic nanofiltration membranes can be used to achieve this separation. The separation of oligomer sugars from monomer sugars will require a membrane with larger pore size than 200 Dalton.

About 100 mL of the permeate, having a sulphuric acid concentration of about 66.6 g/L (or 6.66 wt %), was concentrated by evaporation to a volume of about 8 mL. The final solution had an acid concentration of about 725 g/l (>60 wt %). No sugar-related precipitation was seen during or after the acid concentration step. The acid concentration used in the NCC production process is about 60 wt %. Thus the recovered acid can be utilised in this process without any concern with sugar-related fouling problems on the evaporator surfaces.

TABLE II

Sugar and acid separation using a nanofiltration membrane

| Samples | Arabinose (g/L) | Glucose (g/L) | Xylose (g/L) | Mannose (g/L) | Total sugars (g/L) | $H_2SO_4$, g/L |
|---|---|---|---|---|---|---|
| Feed | 0.045 | 4.177 | 0.815 | 0.563 | 5.6 | 71.5 |
| Permeate | | 0.13 | 0.0411 | 0.017 | 0.2 | 66.6 |

In the present invention, there is no need for the chromatographic unit as a single nanofiltration step yields a surprisingly good separation of the sugars from the acid. Additionally, the nanofiltration step yielded a concentrated sugar stream which is desirable for fermentation which is free of fermentation inhibitors such as lignin and metals.

No reference is made in the prior art about using nanofiltration to fractionate the spent acid stream from nanocrystalline cellulose production into monomers, oligomers and acid. Thus the prior art does not suggest the present invention.

The invention claimed is:

1. A process for producing NCC comprising:
   acid hydrolysis of bleached wood pulp;
   recovering NCC from said hydrolysis;
   recovering an aqueous waste liquor from said hydrolysis, said aqueous waste liquor containing acid and sugars derived from said hydrolysis of bleached wood pulp, said sugars comprising a monomeric sugar fraction and an oligomeric sugar fraction;
   separating said aqueous waste liquor into discrete fractions of aqueous acid, monomeric sugars and oligomeric sugars with a pair of discrete membranes; said separating comprising:
   a) i) contacting said liquor with a first side of a nanomembrane of said pair selective for the passage of the inorganic acid;
      ii) recovering an aqueous permeate containing said inorganic acid at a second side of said nanomembrane opposed to said first side and recovering said sugars in a non-permeate of said nanomembrane at said first side; said aqueous permeate having a residual content of sugars in a ratio of less than 0.8%, by weight of sugars to acid; and
      iii) contacting said non-permeate with a first side of a membrane of said pair selective for said monomeric sugar fraction, recovering an aqueous permeate containing said monomeric sugar fraction at a second side of said membrane opposed to said first side, and recovering said oligomeric sugar fraction as a non-permeate of said membrane at said first side of said membrane; or b) i) contacting said liquor with a first side of a membrane of said pair selective for the passage of said acid and said monomeric sugar fraction;

ii) recovering a permeate comprising said acid and said monomeric sugar fraction at a second side of said membrane opposed to said first side; and recovering said oligomeric sugar fraction as a non-permeate at said first side of said membrane; and iii) contacting said permeate comprising said acid and said monomeric sugar fraction with a first side of a nanomembrane of said pair selective for the passage of the inorganic acid; and recovering an aqueous permeate containing said inorganic acid at a second side of said membrane opposed to said first side, said aqueous permeate having a residual content of sugars in a ratio of less than 0.8%, by weight of sugars to acid;

concentrating said aqueous permeate containing said inorganic acid and residual sugars from said nanomembrane, without precipitation of sugars or fouling during said concentrating, to an aqueous acid solution having a concentration of acid of 50% to 70%, by weight for acid hydrolysis of bleached wood pulp in NCC production, and recycling said aqueous acid solution as an acid supply to said acid hydrolysis for NCC production.

2. A process according to claim 1, further comprising recovering said sugars as value-added products comprising a monomeric sugar value-added product and an oligomeric sugar value-added product.

3. A process according to claim 1, wherein said separating is by a).

4. A process according to claim 1, wherein said separating is by b).

5. A process according to claim 1, wherein said inorganic acid is sulphuric acid.

6. A process according to claim 1, wherein the recovered aqueous permeate containing said inorganic acid having a residual content of sugars has a ratio of less than 0.5%, by weight of sugars to acid.

7. A process according to claim 2, wherein said separating is by a).

8. A process according to claim 2, wherein said separating is by b).

9. A process according to claim 2, wherein said inorganic acid is sulphuric acid.

10. A process according to claim 3, wherein said inorganic acid is sulphuric acid.

11. A process according to claim 4, wherein said inorganic acid is sulphuric acid.

12. A process according to claim 7, wherein said inorganic acid is sulphuric acid.

13. A process according to claim 8, wherein said inorganic acid is sulphuric acid.

14. A process according to claim 2, wherein the recovered aqueous permeate containing said inorganic acid having a residual content of sugars has a ratio of less than 0.5%, by weight of sugars to acid.

15. A process according to claim 3, wherein the recovered aqueous permeate containing said inorganic acid having a residual content of sugars has a ratio of less than 0.5%, by weight of sugars to acid.

16. A process according to claim 4, wherein the recovered aqueous permeate containing said inorganic acid having a residual content of sugars has a ratio of less than 0.5%, by weight of sugars to acid.

17. A process according to claim 5, wherein the recovered aqueous permeate containing said inorganic acid having a residual content of sugars has a ratio of less than 0.5%, by weight of sugars to acid.

18. A process according to claim 7, wherein the recovered aqueous permeate containing said inorganic acid having a residual content of sugars has a ratio of less than 0.5%, by weight of sugars to acid.

19. A process according to claim 8, wherein the recovered aqueous permeate containing said inorganic acid having a residual content of sugars has a ratio of less than 0.5%, by weight of sugars to acid.

20. A process according to claim 9, wherein the recovered aqueous permeate containing said inorganic acid having a residual content of sugars has a ratio of less than 0.5%, by weight of sugars to acid.

* * * * *